US010367740B2

(12) United States Patent
Zhang et al.

(10) Patent No.: US 10,367,740 B2
(45) Date of Patent: Jul. 30, 2019

(54) METHOD, SYSTEM AND APPARATUS FOR CONTROLLING FLOW DETECTION, CONTROLLER AND DETECTION DEVICE

(71) Applicant: Huawei Technologies Co., Ltd., Shenzhen (CN)

(72) Inventors: Dacheng Zhang, Shenzhen (CN); Yuchen Wang, Beijing (CN); Jian Meng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 571 days.

(21) Appl. No.: 14/711,096

(22) Filed: May 13, 2015

(65) Prior Publication Data
US 2015/0249608 A1 Sep. 3, 2015

Related U.S. Application Data

(63) Continuation of application No. PCT/CN2013/089750, filed on Dec. 18, 2013.

(30) Foreign Application Priority Data

Dec. 18, 2012 (CN) .......................... 2012 1 0551811

(51) Int. Cl.
*H04L 12/803* (2013.01)
*H04L 12/26* (2006.01)
*H04L 12/24* (2006.01)

(52) U.S. Cl.
CPC ........ *H04L 47/125* (2013.01); *H04L 41/0893* (2013.01); *H04L 43/026* (2013.01); *H04L 43/12* (2013.01)

(58) Field of Classification Search
CPC .................................................... H04L 47/125
(Continued)

(56) References Cited

U.S. PATENT DOCUMENTS

2009/0316711 A1* 12/2009 Memon .................. H04L 47/10
370/412
2011/0082931 A1 4/2011 Wang et al.
(Continued)

FOREIGN PATENT DOCUMENTS

CN 101056215 A 10/2007
CN 101056274 A 10/2007
(Continued)

OTHER PUBLICATIONS

Wang, K., et al., "LiveSec: Towards Effective Security Management in Large-scale Production Networks," 32nd International Conference on Distributed Computing Systems Workshops, 2012, pp. 451-460.
(Continued)

*Primary Examiner* — Sm A Rahman
*Assistant Examiner* — Emad Siddiqi
(74) *Attorney, Agent, or Firm* — Conley Rose, P.C.

(57) ABSTRACT

A control method, system and apparatus for flow detection, a controller and a detection device. The method includes the controller acquires a flow identifier of a flow to be detected by each flow detection module in a network; adjusts the flow to be detected by each flow detection module according to a set load balancing policy; and delivers a detection instruction to each flow detection module, where the detection instruction includes a flow identifier of a flow to be detected by each flow detection module after the adjustment. In the present invention, because multiple flow detection modules are deployed in a network in a distributed manner, when there are a large number of switching devices included in the network, load balancing can be performed for detection of flows transmitted between these switching devices.

13 Claims, 5 Drawing Sheets

(58) Field of Classification Search
USPC .......................................................... 709/226
See application file for complete search history.

(56) References Cited

U.S. PATENT DOCUMENTS

| | | | |
|---|---|---|---|
| 2011/0164503 A1 | 7/2011 | Yong et al. | |
| 2011/0283016 A1 | 11/2011 | Uchida | |
| 2012/0195204 A1* | 8/2012 | Patel | H04L 45/00 370/237 |
| 2012/0287791 A1* | 11/2012 | Xi | H04L 43/0882 370/237 |
| 2014/0269319 A1* | 9/2014 | DeCusatis | H04L 47/12 370/236 |

FOREIGN PATENT DOCUMENTS

| | | |
|---|---|---|
| CN | 101217467 A | 7/2008 |
| CN | 101340327 A | 1/2009 |
| CN | 101471817 A | 7/2009 |
| CN | 103095521 A | 5/2013 |
| WO | 2012133290 A1 | 10/2012 |

OTHER PUBLICATIONS

Foreign Communication From a Counterpart Application, European Application No. 13864831.6, Extended European Search Report dated Oct. 9, 2015, 9 pages.
Partial English Translation and Abstract of Chinese Patent Application No. CN101217467A, May 8, 2015, 5 pages.
Partial English Translation and Abstract of Chinese Patent Application No. CN103095521A, May 7, 2015, 3 pages.
Foreign Communication From a Counterpart Application, Chinese Application No. 201210551811.1, Chinese Office Action dated Mar. 3, 2015, 5 pages.
Foreign Communication From a Counterpart Application, PCT Application No. PCT/CN2013/089750, English Translation of International Search Report dated Mar. 27, 2014, 3 pages.
Foreign Communication From a Counterpart Application, PCT Application No. PCT/CN2013/089750, English Translation of Written Opinion dated Mar. 27, 2014, 19 pages.
"Research of Network Traffic Measurement and Load Balancing Technology," Apr. 2009, 80 pages.

* cited by examiner

METHOD, SYSTEM AND APPARATUS FOR CONTROLLING FLOW DETECTION, CONTROLLER AND DETECTION DEVICE

CROSS-REFERENCE TO RELATED APPLICATIONS

This application is a continuation of International Application No. PCT/CN2013/089750, filed on Dec. 18, 2013, which claims priority to Chinese Patent Application No. 201210551811.1, filed on Dec. 18, 2012, both of which are hereby incorporated by reference in their entireties.

TECHNICAL FIELD

The present invention relates to the field of network communications technologies, and in particular, to a method, system and apparatus for controlling flow detection, a controller and a detection device.

BACKGROUND

A conventional network architecture generally includes several routing switching devices, and each routing switching device may be connected to several host devices, and all the routing switching devices are directly or indirectly connected to a gateway device, and are connected to an external network by means of the gateway device. In the prior art, a flow detection device may be deployed on a critical path in a network. For example, for a local area network or a corporate network, a flow detection device may be deployed on a connection path of a gateway device and an external network, so as to detect overall flows of the local area network or the corporate network. However, because deploying a flow detection device on a critical path in a network can only detect overall flows of the network, it is difficult to detect flows transmitted between switching devices in the network. Therefore, in an existing manner, a flow detection device is deployed in the network, and all switching devices are connected to the flow detection device, and the flow detection device detects flows transmitted between the switching devices in the network.

During a research on the prior art, the inventor discovers that, although flows transmitted between switching devices in a network can be detected by deploying a flow detection device in the network, when there are a large number of switching devices in the network, the number of flows that need to be detected by the flow detection device is large, and therefore the flow detection device is load-imbalanced and is easy to break down.

SUMMARY

Embodiments of the present invention provide a method, system and apparatus for controlling flow detection, a controller and a detection device, so as to resolve problems in the prior art that flow detection load is imbalanced and that a flow detection device in a network is easy to break down.

To resolve the foregoing technical problems, the embodiments of the present invention disclose the following technical solutions.

According to a first aspect, a method for controlling flow detection is provided, where the method is applied to a network including multiple flow detection modules, and the method includes acquiring, by a controller, a flow identifier of a flow to be detected by each flow detection module in the network, where each flow detection module corresponds to at least one switching device; adjusting, by the controller, according to a set load balancing policy, the flow to be detected by each flow detection module; and delivering, by the controller, a detection instruction to each flow detection module, where the detection instruction includes a flow identifier of a flow to be detected by each flow detection module after the adjustment.

With reference to the first aspect, in a first possible implementation manner of the first aspect, the acquiring, by a controller, a flow identifier of a flow to be detected by each flow detection module in the network includes looking up, by the controller, a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; and acquiring, from the flow forwarding rule, a flow identifier of a flow corresponding to a device identifier of a same switching device, and determining that the flow corresponding to the device identifier of the same switching device is a flow to be detected by a flow detection module corresponding to the switching device.

With reference to the first aspect, or the first possible implementation manner of the first aspect, in a second possible implementation manner of the first aspect, the adjusting, by the controller, according to a set load balancing policy, the flow to be detected by each flow detection module is invoking, by the controller, a weighted average policy to adjust the flow to be detected by each flow detection module, so that the number of flows to be detected by each flow detection module is consistent after the adjustment.

According to a second aspect, a method for controlling flow detection is provided, where the method is applied to each flow detection module in a network including multiple flow detection modules, where each flow detection module corresponds to at least one switching device, and the method includes receiving, by a flow detection module, a detection instruction delivered by a controller in the network, where the detection instruction includes a flow identifier of a flow to be detected by the flow detection module in the network after adjustment that is performed by the controller according to a set load balancing policy after acquiring a flow identifier of a flow to be detected by each flow detection module; and detecting, by the flow detection module, a flow corresponding to the flow identifier included in the detection instruction.

With reference to the second aspect, in a first possible implementation manner of the second aspect, the flow detection module is disposed on a corresponding switching device; or the flow detection module is disposed on a detection device connected to the corresponding switching device.

According to a third aspect, a system for controlling flow detection is provided, where the system includes a controller, multiple switching devices and multiple flow detection modules, where each flow detection module corresponds to at least one switching device; each of the switching devices is configured to forward a flow in a network; the controller is configured to acquire a flow identifier of a flow to be detected by each flow detection module in the network, adjust, according to a set load balancing policy, the flow to be detected by each flow detection module, and deliver a detection instruction to each flow detection module, where the detection instruction includes a flow identifier of a flow to be detected by each flow detection module after the adjustment; and each of the flow detection modules is configured to detect a flow corresponding to the flow identifier included in the detection instruction delivered by the controller.

With reference to the third aspect, in a first possible implementation manner of the third aspect, the controller is configured to look up a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; acquire, from the flow forwarding rule, a flow identifier of a flow corresponding to a device identifier of a same switching device; and determine that the flow corresponding to the device identifier of the same switching device is a flow to be detected by a flow detection module corresponding to the switching device.

With reference to the third aspect or the first possible implementation manner of the third aspect, in a second possible implementation manner of the third aspect, the flow detection module is disposed on a corresponding switching device; or the flow detection module is disposed on a detection device connected to the corresponding switching device.

According to a fourth aspect, an apparatus for controlling flow detection is provided, where the apparatus is applied to a network including multiple flow detection modules, and the apparatus includes an acquiring unit, configured to acquire a flow identifier of a flow to be detected by each flow detection module in the network, where each flow detection module corresponds to at least one switching device; an adjusting unit, configured to adjust, according to a set load balancing policy, the flow to be detected by each flow detection module; and a controlling unit, configured to deliver a detection instruction to each flow detection module, where the detection instruction includes a flow identifier of a flow to be detected by each flow detection module after the adjustment.

With reference to the fourth aspect, in a first possible implementation manner of the fourth aspect, the acquiring unit includes a rule lookup subunit, configured to look up a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; and an identifier acquiring subunit, configured to acquire, from the flow forwarding rule, a flow identifier of a flow corresponding to a device identifier of a same switching device, and determine that the flow corresponding to the device identifier of the same switching device is a flow to be detected by a flow detection module corresponding to the switching device.

With reference to the fourth aspect or the first possible implementation manner of the fourth aspect, in a second possible implementation manner of the fourth aspect, the adjusting unit is configured to invoke a weighted average policy to adjust the flow to be detected by each flow detection module, so that the number of flows to be detected by each flow detection module is consistent after the adjustment.

With reference to the fourth aspect, or the first possible implementation manner of the fourth aspect, or the second possible implementation manner of the fourth aspect, in a third possible implementation manner of the fourth aspect, the apparatus for controlling is disposed on a controller in the network.

According to a fifth aspect, a controller is provided, where the controller is applied to a network including multiple flow detection modules, and the controller includes a bus, and a network interface, a memory and a processor that are connected by means of the bus, where the network interface is configured to connect multiple switching devices in the network, where each flow detection module corresponds to at least one switching device; the memory is configured to store a set load balancing policy; and the processor is configured to acquire a flow identifier of a flow to be detected by each flow detection module in the network, adjust, according to the load balancing policy, the flow to be detected by each flow detection module, and deliver a detection instruction to each flow detection module, where the detection instruction includes a flow identifier of a flow to be detected by each flow detection module after the adjustment.

With reference to the fifth aspect, in a first possible implementation manner of the fifth aspect, the memory is further configured to store a flow forwarding rule in the network; and the processor is configured to look up the stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; acquire, from the flow forwarding rule, a flow identifier of a flow corresponding to a device identifier of a same switching device; and determine that the flow corresponding to the device identifier of the same switching device is a flow to be detected by a flow detection module corresponding to the switching device.

With reference to the fifth aspect or the first possible implementation manner of the first aspect, in a second possible implementation manner of the fifth aspect, the memory is configured to store a set weighted average policy; and the processor is configured to invoke the weighted average policy to adjust the flow to be detected by each flow detection module, so that the number of flows to be detected by each flow detection module is consistent after the adjustment.

According to a sixth aspect, a flow detection apparatus is provided, where the apparatus is applied to a network including multiple flow detection apparatuses, where each of the flow detection apparatuses corresponds to at least one switching device, and the apparatus includes a receiving unit, configured to receive a detection instruction delivered by a controller in the network, where the detection instruction includes a flow identifier of a flow to be detected by the flow detection module in the network after adjustment that is performed by the controller according to a set load balancing policy after acquiring a flow identifier of a flow to be detected by each flow detection module; and a detection unit, configured to detect a flow corresponding to the flow identifier included in the detection instruction.

With reference to the sixth aspect, in a first possible implementation manner of the sixth aspect, the flow detection apparatus is disposed on a corresponding switching device; or the flow detection apparatus is disposed on a detection device connected to the corresponding switching device.

According to a seventh aspect, a detection device is provided, where the detection device is applied to a network including multiple detection devices, where each of the detection devices corresponds to at least one switching device, and the detection device includes a bus, and a network interface and a processor that are connected by means of the bus, where the network interface is configured to connect a controller in the network and a switching device corresponding to the detection device; and the processor is configured to receive a detection instruction delivered by the controller, where the detection instruction includes a flow identifier of a flow to be detected by the flow detection module after adjustment that is performed by the controller according to a set load balancing policy after acquiring a flow identifier of a flow to be detected by each flow detection module; and detect a flow corresponding to the flow identifier included in the detection instruction.

In the embodiments of the present invention, a controller acquires a flow identifier of a flow to be detected by each flow detection module in a network, adjusts, according to a set load balancing policy, the flow to be detected by each flow detection module, and delivers a detection instruction to each flow detection module, where the detection instruction includes a flow identifier of a flow to be detected by each flow detection module after the adjustment. In the embodiments of the present invention, because multiple flow detection modules are deployed in a network in a distributed manner, when there are a large number of switching devices included in the network, load balancing can be performed for detection of flows transmitted between these switching devices, so that flows transmitted in the network can be evenly distributed to the flow detection modules as much as possible, thereby decreasing the number of flows to be detected by a single flow detection module and ensuring normal flow detection in the network.

BRIEF DESCRIPTION OF DRAWINGS

To describe the technical solutions in the embodiments of the present invention or in the prior art more clearly, the following briefly introduces the accompanying drawings required for describing the embodiments or the prior art. A person of ordinary skill in the art may still derive other drawings from these accompanying drawings without creative efforts.

DESCRIPTION OF EMBODIMENTS

The following embodiments of the present invention provide a control method, system and apparatus for flow detection, a controller and a detection device.

To enable a person skilled in the art to better understand technical solutions in embodiments of the present invention, and make the foregoing purposes, features, and advantages of the embodiments of the present invention clearer and more comprehensible, the following describes the technical solutions of the embodiments of the present invention in more detail with reference to accompanying drawings.

The following embodiments of the present invention may be applied to a software-defined network (SDN). An SDN network separates a control plane of a network device from a data forwarding plane of the network device, so that network flows can be controlled flexibly. A function of the control plane is implemented by a controller, which is mainly responsible for delivering a flow forwarding policy, and in the embodiments of the present invention, the controller further has a function of controlling network flow detection. A function of the data forwarding plane is implemented by a switch (SW), which is mainly configured to receive the flow forwarding policy delivered by the controller, and forward a flow according to the forwarding policy. Generally in an SDN network, a controller is separately connected to each switch, and flow forwarding between switches is implemented by mutual connection. In the embodiments of the present invention, multiple flow detection modules may be deployed in an SDN network, and each flow detection module is connected to one switch, and may be configured to detect network traffic flowing through the switch; and the flow detection module may be integrated into the switch, or may also be disposed in a device independent of the switch, for example, the flow detection module may be disposed in a firewall (FW) device, an intrusion prevention system (IPS) device, an Intrusion Detection System (IDS) device, or the like, and in this case, the device is connected to a corresponding switch.

Figure 1:
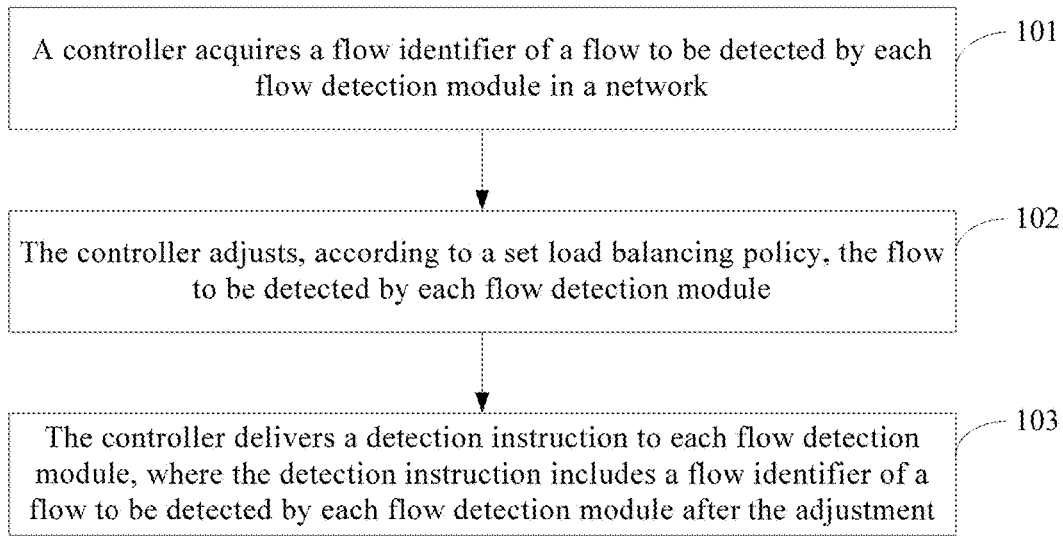
FIG. 1 is a flowchart of an embodiment of a method for controlling flow detection according to the present invention.

FIG. 1 is a flowchart of an embodiment of a method for controlling flow detection according to the present invention, and this embodiment describes a process of controlling flow detection on a controller side in a network.

Step 101: A controller acquires a flow identifier of a flow to be detected by each flow detection module in the network.

In this embodiment, each flow detection module corresponds to at least one switching device.

The controller is connected to each switching device, and the controller stores flow forwarding rules of all flows in the network, where the flow forwarding rules include a flow identifier and a transmission path of each flow. The flow identifier may include a source address and a destination address of the flow, and the transmission path may include a device identifier of a switching device through which the flow is transmitted from the source address to the destination address. When the controller needs to acquire a flow identifier of a flow to be detected by each flow detection module, the controller may look up a stored flow forwarding rule, and acquire a flow identifier of a flow corresponding to a device identifier of a same switching device, and determine that the flow corresponding to the device identifier of the same switching device is a flow to be detected by a flow detection module corresponding to the switching device.

Step 102: The controller adjusts, according to a set load balancing policy, the flow to be detected by each flow detection module.

In this embodiment, the controller may invoke a weighted average policy to adjust the flow to be detected by each flow detection module, so that the number of flows to be detected by each flow detection module is consistent after the adjustment. It should be noted that, any load balancing policy of the prior art may be used in this embodiment of the present invention, so long as flows to be detected by flow detection modules can be balanced using the load balancing policy, which is not limited in this embodiment of the present invention.

Step 103: The controller delivers a detection instruction to each flow detection module, where the detection instruction includes a flow identifier of a flow to be detected by each flow detection module after the adjustment.

Because originally traffic flowing through each switching device is different in the network, the numbers of flows to be detected by network flow detection modules are also different. Especially for flows of flow detection modules that are disposed in at least two switching devices on the transmission path, it may be implemented that the flows are detected by only one of the flow detection modules by means of load balancing.

It can be learned from the foregoing embodiment that, because multiple flow detection modules are deployed in a network in a distributed manner, when there are a large number of switching devices included in the network, load balancing can be performed for detection of flows transmitted between these switching devices, so that flows transmitted in the network can be evenly distributed to the flow detection modules as much as possible, thereby decreasing the number of flows to be detected by a single flow detection module and ensuring normal flow detection in the network.

Figure 2:
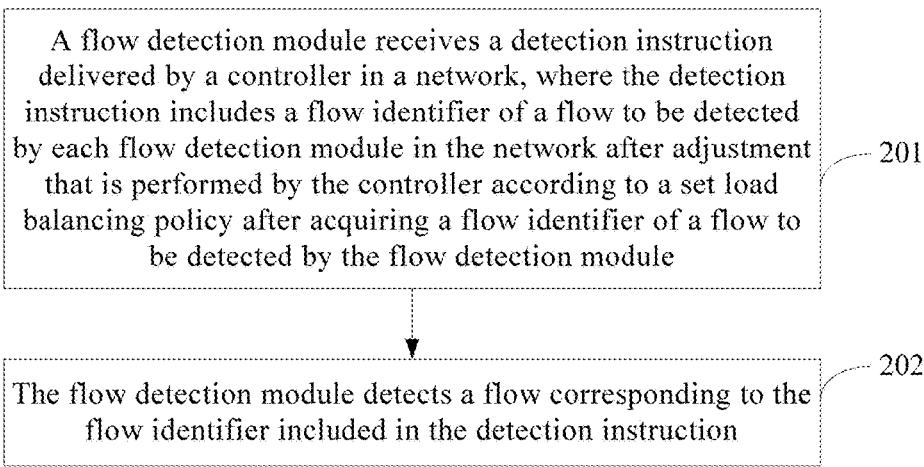
FIG. 2 is a flowchart of another embodiment of a method for controlling flow detection according to the present invention.

FIG. 2 is a flowchart of another embodiment of a method for controlling flow detection according to the present invention, and this embodiment describes a process of controlling flow detection on a side of any flow detection module in a network.

Step 201: A flow detection module receives a detection instruction delivered by a controller in the network, where the detection instruction includes a flow identifier of a flow to be detected by the flow detection module in the network after adjustment that is performed by the controller according to a set load balancing policy after acquiring a flow identifier of a flow to be detected by each flow detection module.

In this embodiment, the flow detection module may be disposed on a corresponding switching device, or the flow detection module may also be disposed on a detection device connected to the corresponding switching device.

In this embodiment, each controller is connected to multiple flow detection modules, and therefore, after performing load balancing for detection of all flows in the network, the controller delivers a detection instruction to each flow detection module. The detection instruction may include only the flow identifier of the flow to be detected by the flow detection module; or the detection instruction may also include a flow identifier of a flow to be detected by each flow detection module in all flow detection modules. Any flow detection module may acquire, according to a module identifier of itself, a flow identifier of a flow to be detected.

Step 202: The flow detection module detects the flow corresponding to the flow identifier included in the detection instruction.

After the flow detection module receives the detection instruction, the flow identifier included in the detection module may be used to update an originally stored flow identifier of a flow to be detected by the flow detection module, so that flow detection is performed according to an updated flow identifier.

It can be learned from the foregoing embodiment that, because multiple flow detection modules are deployed in a network in a distributed manner, when there are a large number of switching devices included in the network, load balancing can be performed for detection of flows transmitted between these switching devices, so that flows transmitted in the network can be evenly distributed to the flow detection modules as much as possible, thereby decreasing the number of flows to be detected by a single flow detection module and ensuring normal flow detection in the network.

Figure 3:
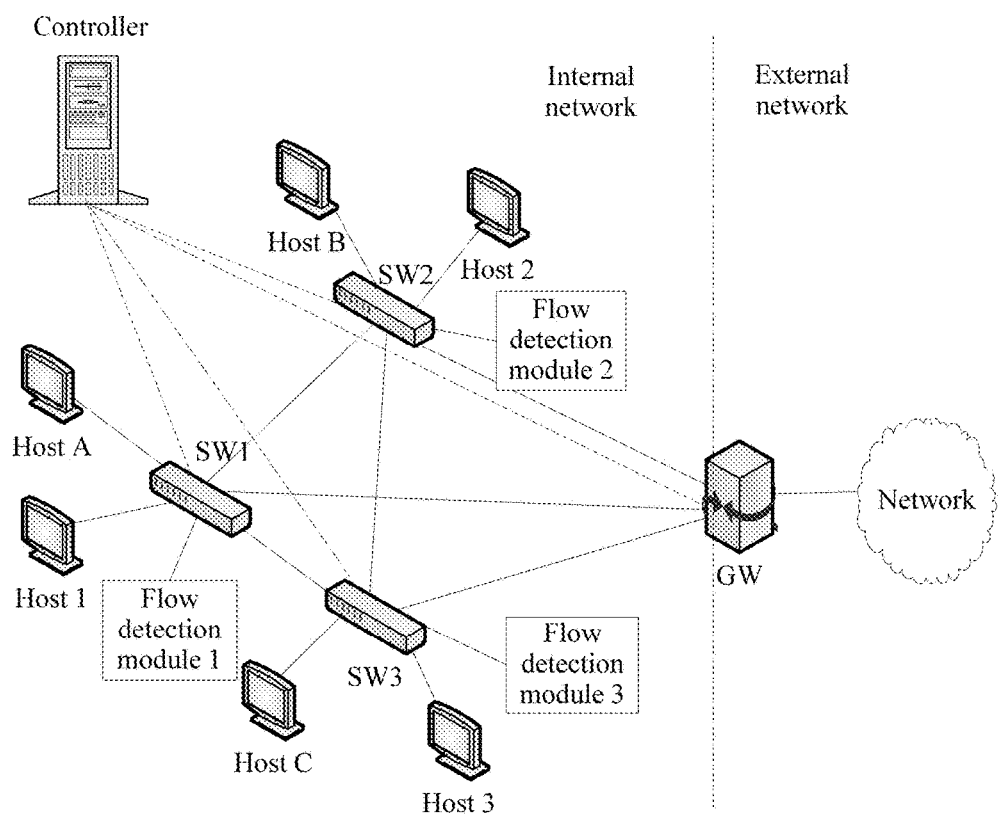
FIG. 3 is a schematic diagram of a network architecture applied in an embodiment of the present invention.

FIG. 3 is a schematic diagram of a network architecture applied to the foregoing method embodiment of the present invention.

The network architecture in FIG. 3 may be an architecture based on an SDN network, and as an example, the network architecture is divided into an internal network and an external network, where the internal network includes a controller, three switches, which are respectively a SW1, a SW2, and a SW3, and three flow detection modules, which are respectively a flow detection module 1 corresponding to the SW1, a flow detection module 2 corresponding to the SW2, and a flow detection module 3 corresponding to the SW3. The foregoing controller and the three switches are all connected to a gateway (GW), and connected to the external network by means of the GW. Each switch is connected to two host devices, including a host device A and a host device 1 that are connected to the SW1, a host device B and a host device 2 that are connected to the SW2, and a host device C and a host device 3 that are connected to the SW3. The controller is mutually connected to each switch, and a flow detection module of each switch may also separately communicate with the controller, where a function of the flow detection module of each switch may be integrated into the switch, or may also be configured in a detection device connected to the switch, that is, one detection device may be configured for each switch, which is not limited in this embodiment of the present invention.

The following describes a process for controlling flow detection described in this embodiment of the present invention with reference to the network architecture shown in FIG. 3.

Firstly, the controller may acquire a flow identifier and a transmission path of each flow from a stored flow forwarding rule, and obtain, according to the flow identifier and the transmission path, a flow detection module that detects each flow, where a result is shown in the following Table 1:

TABLE 1

| Flow identifier | Transmission path | Flow detection module |
|---|---|---|
| A<->N | SW1, GW | Flow detection module 1 |
| A<->1 | SW1 | Flow detection module 1 |
| A<->C | SW1, SW3 | Flow detection module 1, flow detection module 3 |
| B<->N | SW2, GW | Flow detection module 2 |
| B<->2 | SW2 | Flow detection module 2 |
| B<->1 | SW2, SW1 | Flow detection module 2, flow detection module 1 |
| C<->N | SW3, GW | Flow detection module 3 |
| C<->3 | SW3 | Flow detection module 3 |
| 2<->3 | SW2, SW3 | Flow detection module 2, flow detection module 3 |

In the foregoing Table 1, a flow identifier being A<->N is used as an example, where "A" indicates an address of the host A that is used as a source address, "N" indicates an address of the Network that is used as a destination address; a transmission path being "SW1, GW" is used as an example, which indicates that a flow "A<->N" needs to go through the switching device SW1 and the GW in a process of transmission from the host A to the Network, and because the flow detection module 1 is configured for the SW1, the flow "A<->N" is detected by the flow detection module 1 before load balancing is performed for flow detection.

According to the foregoing Table 1, before load balancing, flows that need to be detected originally by the flow detection module 1 are A<->N, A<->1, A<->C and B<->1; flows that need to be detected originally by the flow detection module 2 are B<->N, B<->2, B<->1 and 2<->3; flows that need to be detected originally by the flow detection module 3 are A<->C, C<->N, C<->3 and 2<->3. Which policy is adopted to perform load balancing for detection of the flows is not limited in this embodiment of the present invention, and therefore, in an optional policy example, it is assumed that a weighted average policy is adopted to perform load balancing for the foregoing flows, and then the following load balancing results may be acquired: the flow detection module 1 detects flows A<->N, A<->1, A<->C, the flow detection module 2 detects flows B<->N, B<->2, B<->1, and the flow detection module 3 detects flows C<->N, C<->3 and 2<->3.

After the controller executes the foregoing load balancing policy, it can be ensured that each flow detection module detects three flows, and in this case, the controller delivers a detection instruction that includes flow identifiers A<->N, A<->1, and A<->C to the flow detection module 1, a detection instruction that includes flow identifiers B<->N, B<->2, and B<->1 to the flow detection module 2, and a detection instruction that includes flow identifiers C<->N, C<->3 and 2<->3 to the flow detection module 3. The flow detection module 1 is used as an example. The flow detection module 1 detects only the flows with the flow identifiers of A<->N, A<->1, and A<->C, and no longer detects the flow with the flow identifier of B<->1.

It can be learned from the foregoing embodiment that, because multiple flow detection modules are deployed in a network in a distributed manner, when there are a large number of switching devices included in the network, load balancing can be performed for detection of flows transmitted between these switching devices, so that flows transmitted in the network can be evenly distributed to the flow detection modules as much as possible, thereby decreasing the number of flows to be detected by a single flow detection module and ensuring normal flow detection in the network.

Corresponding to the embodiment of the method for controlling flow detection according to the present invention, embodiments of a system and apparatus for controlling flow detection, a controller and a detection device are further provided in the present invention.

Figure 4:
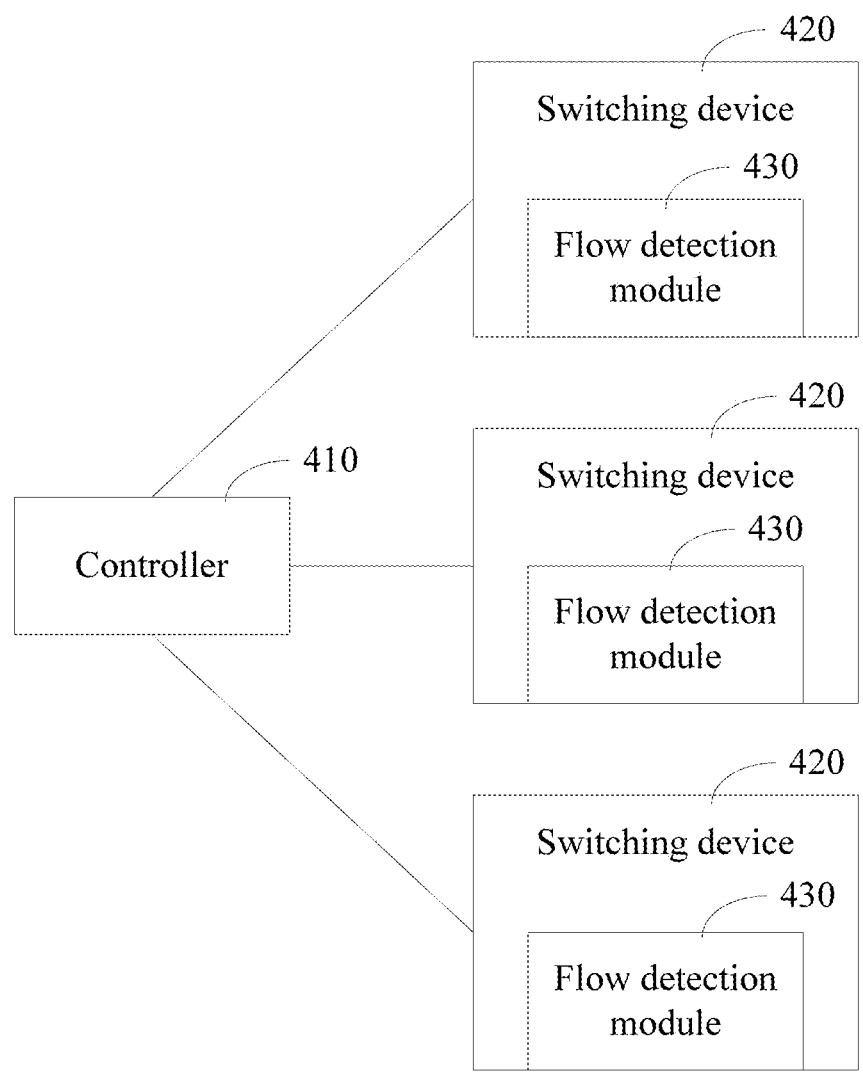
FIG. 4 is a block diagram of an embodiment of a system for controlling flow detection according to the present invention.

FIG. 4 is a block diagram of an embodiment of a system for controlling flow detection according to the present invention.

The system includes a controller 410, multiple switching devices 420 and multiple flow detection modules 430, where each flow detection module may correspond to at least one switching device. For ease of illustration in FIG. 4, three switching devices are illustrated, and a flow detection module is disposed in each switching device. It should be noted that each flow detection module may also be disposed in a detection device, which is independent of a switching device and connected to the switching device. This is not limited in this embodiment of the present invention.

Each of the switching devices 420 is configured to forward a flow in a network.

The controller 410 is configured to acquire a flow identifier of a flow to be detected by each flow detection module in the network, adjust, according to a set load balancing policy, the flow to be detected by each flow detection module, and deliver a detection instruction to each flow detection module, where the detection instruction includes a flow identifier of a flow to be detected by each flow detection module after the adjustment.

Each of the flow detection modules 430 is configured to detect a flow corresponding to the flow identifier included in the detection instruction delivered by the controller.

Optionally, the controller 410 is configured to look up a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; acquire, from the flow forwarding rule, a flow identifier of a flow corresponding to a device identifier of a same switching device; and determine that the flow corresponding to the device identifier of the same switching device is a flow to be detected by a flow detection module corresponding to the switching device.

Figure 5:
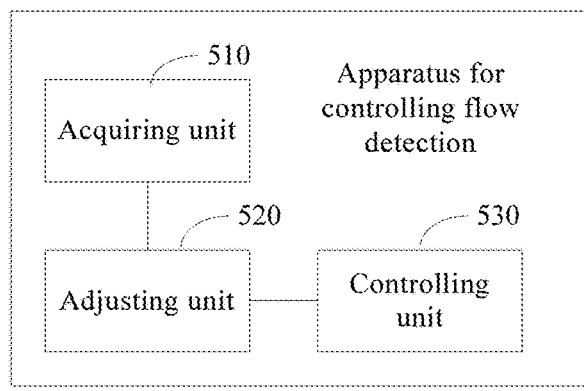
FIG. 5 is a block diagram of an embodiment of an apparatus for controlling flow detection according to the present invention.

FIG. 5 is a block diagram of an embodiment of an apparatus for controlling flow detection according to the present invention. The apparatus may be applied to the system illustrated in the foregoing FIG. 4, for example, the apparatus may be disposed on the controller in the network illustrated in the foregoing FIG. 4.

The apparatus for controlling includes an acquiring unit 510, an adjusting unit 520 and a controlling unit 530, where the acquiring unit 510 is configured to acquire a flow identifier of a flow to be detected by each flow detection module in the network, where each flow detection module corresponds to at least one switching device; the adjusting unit 520 is configured to adjust, according to a set load balancing policy, the flow to be detected by each flow detection module; and the controlling unit 530 is configured to deliver a detection instruction to each flow detection module, where the detection instruction includes a flow identifier of a flow to be detected by each flow detection module after the adjustment.

Optionally, the acquiring unit 510 may further include (not illustrated in FIG. 5) a rule lookup subunit, configured to look up a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; and an identifier acquiring subunit, configured to acquire, from the flow forwarding rule, a flow identifier of a flow corresponding to a device identifier of a same switching device, and determine that the flow corresponding to the device identifier of the same switching device is a flow to be detected by a flow detection module corresponding to the switching device.

Optionally, the adjusting unit 520 may be configured to invoke a weighted average policy to adjust the flow to be detected by each flow detection module, so that the number of flows to be detected by each flow detection module is consistent after the adjustment.

Figure 6:
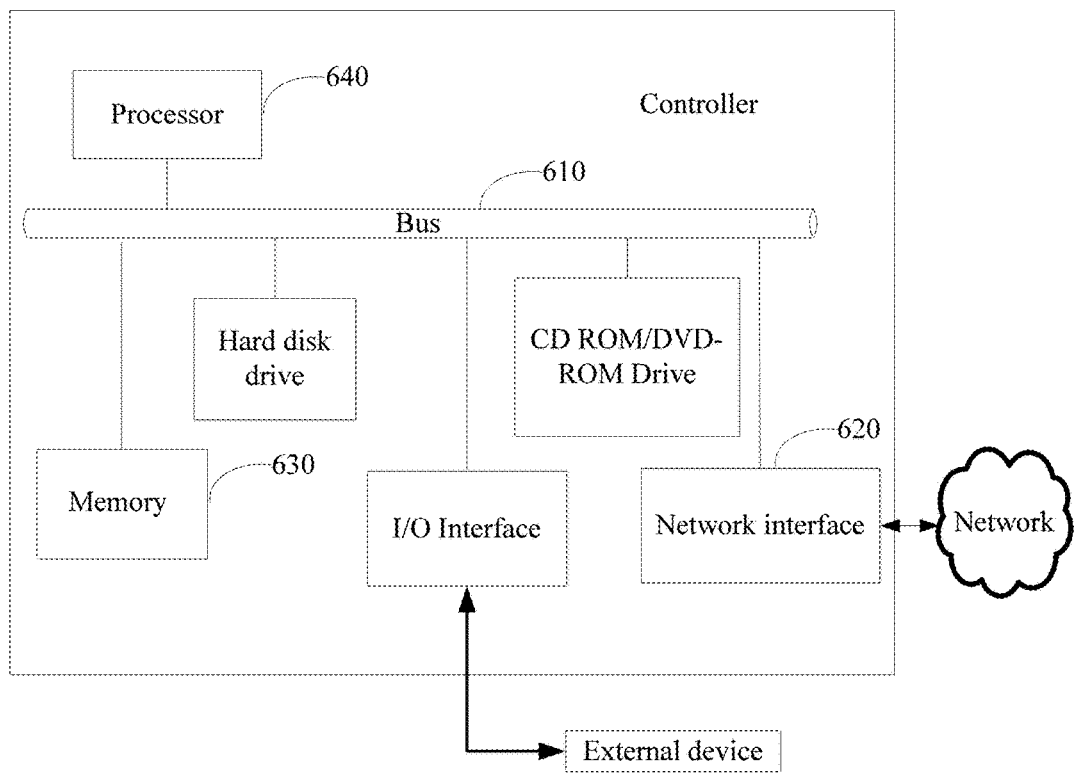
FIG. 6 is a block diagram of an embodiment of a controller according to the present invention.

FIG. 6 is a block diagram of an embodiment of a controller according to the present invention. The controller may be applied to the network illustrated in the foregoing FIG. 4 that includes multiple flow detection modules.

The controller includes a bus 610, and a network interface 620, a memory 630 and a processor 640 that are connected by means of the bus 610, where the network interface 620 is configured to connect multiple switching devices in the network, where each flow detection module corresponds to at least one switching device; the memory 630 is configured to store a set load balancing policy; and the processor 640 is configured to acquire a flow identifier of a flow to be detected by each flow detection module in the network, adjust, according to the load balancing policy, the flow to be detected by each flow detection module, and deliver a detection instruction to each flow detection module, where the detection instruction includes a flow identifier of a flow to be detected by each flow detection module after the adjustment.

Optionally, the memory 630 is further configured to store a flow forwarding rule in the network; and the processor 640 is configured to look up a stored flow forwarding rule, where the flow forwarding rule includes a flow identifier and a transmission path of each flow, where the flow identifier includes a source address and a destination address of the flow, and the transmission path includes a device identifier of a switching device through which the flow is transmitted from the source address to the destination address; acquire, from the flow forwarding rule, a flow identifier of a flow corresponding to a device identifier of a same switching device; and determine that the flow corresponding to the device identifier of the same switching device is a flow to be detected by a flow detection module corresponding to the switching device.

Optionally, the memory 630 is configured to store a set weighted average policy; and the processor 640 is configured to invoke the weighted average policy to adjust the flow to be detected by each flow detection module, so that the number of flows to be detected by each flow detection module is consistent after the adjustment.

Figure 7:
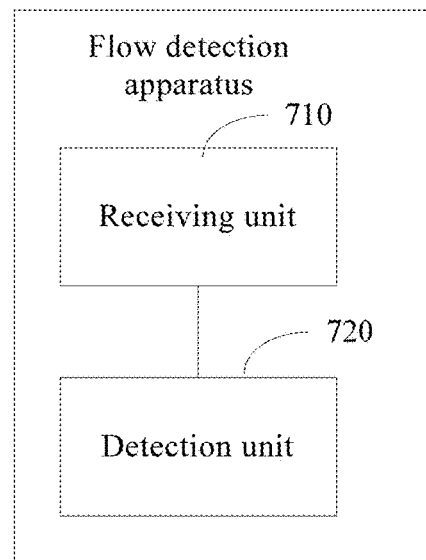
FIG. 7 is a block diagram of an embodiment of a flow detection apparatus according to the present invention.

FIG. 7 is a block diagram of an embodiment of a flow detection apparatus according to the present invention. The flow detection apparatus may be applied to the system illustrated in the foregoing FIG. 4. The flow detection apparatus has a function of a flow detection module, and may be disposed in at least one corresponding switching device, or may also be disposed in a detection device, which is independent of a switching device and connected to the switching device.

The flow detection apparatus includes a receiving unit 710 and a detection unit 720, where the receiving unit 710 is configured to receive a detection instruction delivered by a controller in a network, where the detection instruction includes a flow identifier of a flow to be detected by the flow detection apparatus in the network after adjustment that is performed by the controller according to a set load balancing policy after acquiring a flow identifier of a flow to be detected by each flow detection apparatus; and the detection unit 720 is configured to detect a flow corresponding to the flow identifier included in the detection instruction.

Figure 8:
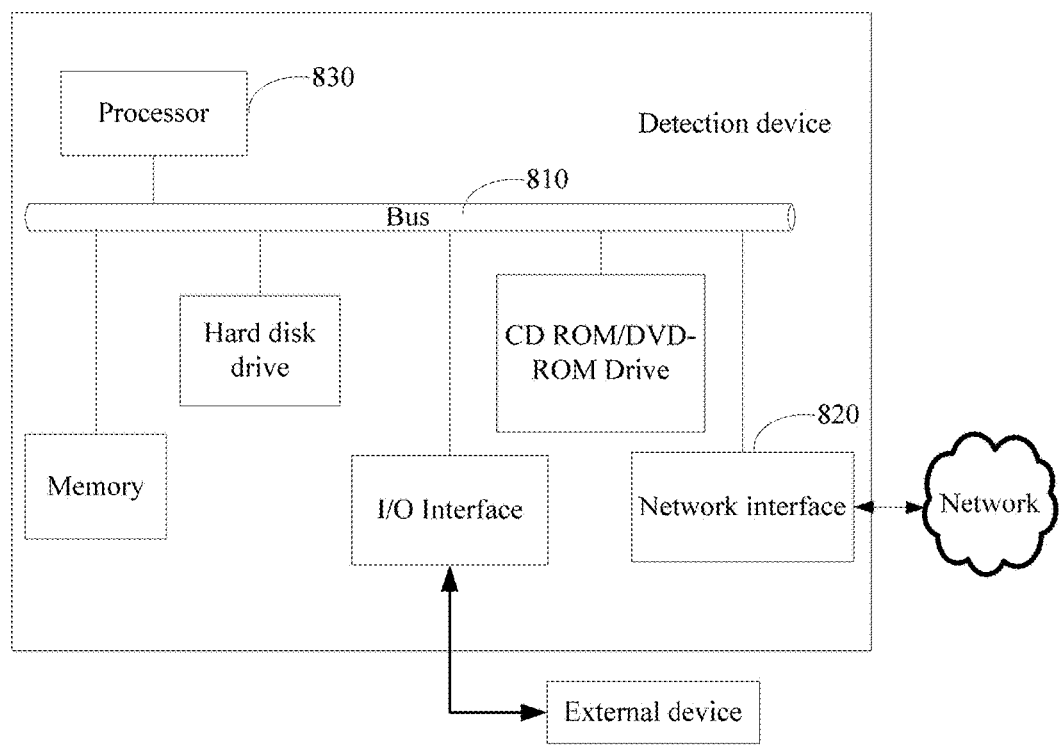
FIG. 8 is a block diagram of an embodiment of a detection device according to the present invention.

FIG. 8 is a block diagram of an embodiment of a detection device according to the present invention. The detection device may be applied to the system illustrated in the foregoing FIG. 4. The detection device includes a function of a flow detection module, and the detection device corresponds to at least one switching device and is connected to the at least one switching device.

The detection device includes a bus 810, and a network interface 820 and a processor 830 that are connected by means of the bus 810, where the network interface 820 is configured to connect a controller in a network and the switching device corresponding to the detection device; and the processor 830 is configured to receive a detection instruction delivered by the controller, where the detection instruction includes a flow identifier of a flow to be detected by the detection device in the network after adjustment that is performed by the controller according to a set load balancing policy after acquiring a flow identifier of a flow to be detected by each detection device; and detect a flow corresponding to the flow identifier included in the detection instruction.

It can be learned from the foregoing embodiment that, a controller acquires a flow identifier of a flow to be detected by each flow detection module in a network, adjusts, according to a set load balancing policy, the flow to be detected by each flow detection module, and delivers a detection instruction to each flow detection module, where the detection instruction includes a flow identifier of a flow to be detected by each flow detection module after the adjustment. In the embodiments of the present invention, because multiple flow detection modules are deployed in a network in a distributed manner, when there are a large number of switching devices included in the network, load balancing can be performed for detection of flows transmitted between these switching devices, so that flows transmitted in the network can be evenly distributed to the flow detection modules as much as possible, thereby decreasing the number of flows to be detected by a single flow detection module and ensuring normal flow detection in the network.

A person skilled in the art may clearly understand that, the technique in the embodiments of the present invention may be implemented through software and a necessary general hardware platform. Based on such an understanding, the technical solutions of the present invention essentially or the part contributing to the prior art may be implemented in a form of a software product. The software product is stored in a storage medium, such as a read-only memory (ROM), random access memory (RAM), a hard disk, or an optical disc, and includes several instructions for instructing a computer device (which may be a personal computer, a server, or a network device) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for controlling flow detection, the method being applied to a network comprising a first detection device, a second detection device, and multiple switching devices, the first detection device being coupled to a first switching device of the switching devices, the second detection device being coupled to a second switching device of the switching devices, and the method comprising:

acquiring, by a controller, at least two flows to be detected by the first detection device and at least one flow to be detected by the second detection device in the network, a first flow being transmitted from a source address to a destination address through the first switching device and the second switching device, and the first flow being comprised in the flows to be detected by the first detection device and being comprised in the flow to be detected by the second detection device;

deleting, by the controller according to a set load balancing policy, the first flow from the flows to be detected by the first detection device such that a difference between a number of flows to be detected by the first detection device and a number of the flows to be detected by the second detection device is less than before the deletion; and delivering, by the controller, a detection instruction to the first detection device to instruct the first detection device to no longer detect traffic of the first flow that keeps being transmitted from the source address to the destination address through the first switching device and the second switching device, the detection instruction comprising a flow identifier of a flow to be detected by the first detection device after the deletion.

2. The method of claim 1, wherein acquiring, by the controller, the at least two flows to be detected by the first detection device and the at least one flow to be detected by the second detection device in the network comprises:

looking up, by the controller, stored flow forwarding rules, each of the flow forwarding rules comprising a flow identifier and a transmission path of a flow indicated by the flow identifier, the flow identifier comprising a source address and a destination address of the flow, and the transmission path comprising a device identifier of a switching device through which the flow is transmitted from the source address to the destination address;

acquiring, from the flow forwarding rules, a first rule set and a second rule set, the first rule set comprising at least one flow forwarding rule that comprises a device identifier of the first switching device, and the second rule set comprising at least one flow forwarding rule that comprises a device identifier of the second switching device;

determining at least two flow identifiers that are comprised in a flow forwarding rule in the first rule set as the flow identifier of the flows to be detected by the first detection device; and determining at least one flow identifier that is comprised in a flow forwarding rule in the second rule set as the flow to be detected by the second detection device.

3. The method of claim 2, wherein deleting, by the controller, according to the set load balancing policy, the first flow from the flows to be detected by the first detection device comprises invoking, by the controller, a weighted average policy to delete the first flow from the flows to be detected by the first detection device such that the number of flows to be detected by the first detection device and the number of flows to be detected the second detection device are consistent after the deletion.

4. The method of claim 1, wherein deleting, by the controller, according to the set load balancing policy, the first flow from the flows to be detected by the first detection device comprises invoking, by the controller, a weighted average policy to delete the first flow from the flows to be detected by the first detection device such that the number of flows to be detected by the first detection device and number of flows to be detected by the second detection device are consistent after the deletion.

5. A system for controlling flow detection, comprising:
multiple switching devices;
a first detection device coupled to a first switching device of the switching devices;
a second detection device coupled to a second switching device of the switching devices, each of the switching devices being configured to forward a flow in a network; and
a controller coupled to the switching devices and configured to:
acquire at least two flows to be detected by the first detection device and at least one flow to be detected by the second detection device in the network, a first flow being transmitted from a source address to a destination address through the first switching device and the second switching device, the first flow being comprised in the flows to be detected by the first detection device and being comprised in the flow to be detected by the second detection device;
delete, according to a set load balancing policy, the first flow from the flows to be detected by the first detection device such that a difference between a number of flows to be detected by the first detection device and a number of the flows to be detected by the second detection device is less than before the deletion; and
deliver a detection instruction to the first detection device to instruct the first detection device to no longer detect traffic of the first flow that keeps being transmitted from the source address to the destination address through the first switching device and the second switching device, the detection instruction comprising a flow identifier of a flow to be detected by the first detection device after the deletion, and the first detection device being configured to detect a flow indicated by the flow identifier that is part of the detection instruction delivered by the controller.

6. The system of claim 5, wherein the controller is configured to:
look up stored flow forwarding rules, each of the flow forwarding rules comprising a flow identifier and a transmission path of a flow indicated by the flow identifier, the flow identifier comprising a source address and a destination address of the flow, and the transmission path comprising a device identifier of a switching device through which the flow is transmitted from the source address to the destination address;
acquire, from the flow forwarding rules, a first rule set and a second rule set, the first rule set comprising at least one flow forwarding rule that comprises a device identifier of the first switching device, and the second rule set comprising at least one flow forwarding rule that comprises a device identifier of the second switching device;
determine, at least two flow identifiers that are comprised in a flow forwarding rule in the first rule set as the flow identifier of the flows to be detected by the first detection device; and
determine at least one flow identifier that is comprised in a flow forwarding rule in the second rule set as the flow to be detected by the second detection device.

7. The system of claim 6, wherein the first detection device is integrated with the first switching device.

8. The system of claim 5, wherein the first detection device is integrated with the first switching device.

9. A controller, the controller being applied to a network comprising a first detection device, a second detection device, and multiple switching devices, the first detection device being coupled to a first switching device of the switching devices, the second detection device being coupled to a second switching device of the switching devices, and the controller comprising:
   a bus;
   a network interface configured to couple to the first detection device and the second detection device;
   a memory configured to store a set load balancing policy; and
   a processor, the network interface, the memory, and the processor being coupled by the bus, and the processor being configured to:
      acquire at least two flows to be detected by the first detection device and at least one flow to be detected by the second detection device in the network, a first flow being transmitted from a source address to a destination address through the first switching device and the second switching device, and the first flow being comprised in the flows to be detected by the first detection device and is comprised in the flow to be detected by the second detection device;
      delete, according to the load balancing policy, the first flow from the flows to be detected by the first detection device such that a difference between a number of flows to be detected by the first detection device and a number of the flows to be detected by the second detection device is less than before the deletion; and
      deliver a detection instruction to the first detection device to instruct the first detection device to no longer detect traffic of the first flow that keeps being transmitted from the source address to the destination address through the first switching device and the second switching device, the detection instruction comprising a flow identifier of a flow to be detected by the first detection device after the deletion.

10. The controller of claim 9, wherein the memory is further configured to store flow forwarding rules in the network, and the processor is further configured to:
   look up the stored flow forwarding rules, each of the flow forwarding rules comprising a flow identifier and a transmission path of a flow indicated by the flow identifier, the flow identifier comprising a source address and a destination address of the flow, and the transmission path comprising a device identifier of a switching device through which the flow is transmitted from the source address to the destination address;
   acquire, from the flow forwarding rules, a first rule set and a second rule set, the first rule set comprising at least one flow forwarding rule that comprises a device identifier of the first switching device, and the second rule set comprising at least one flow forwarding rule that comprises a device identifier of the second switching device;
   determine at least two flow identifiers that are comprised in a flow forwarding rule in the first rule set as the flow identifier of the flows to he detected by the first detection device; and
   determine at least one flow identifier that is comprised in a flow forwarding rule in the second rule set as the flow to he detected by the second detection device.

11. The controller of claim 10, wherein the memory is configured to store a set weighted average policy, and the processor is configured to invoke the weighted average policy to delete the first flow from the flows to he detected by the first detection device such that the number of flows to he detected by the first detection device and the number of flows to be detected the second detection device are consistent after the deletion.

12. The controller of claim 9, wherein the memory is configured to store a set weighted average policy, and the processor is configured to invoke the weighted average policy to delete the first flow from the flows to be detected by the first detection device such that the number of flows to be detected by the first detection device and the number of flows to be detected the second detection device are consistent after the deletion.

13. A detection device, the detection device being applied to a network comprising multiple detection devices and multiple switching devices, each of the detection devices being coupled to at least one switching device, and the detection device comprising:
   a bus;
   a network interface configured to couple to a controller in the network and a switching device; and
   a processor, the processor and the network interface being coupled by the bus, and the processor being configured to:
      receive a detection instruction delivered by the controller, the detection instruction comprising a flow identifier of a second flow and not comprising a flow identifier of a first flow, the detection instruction being received after deletion is performed by the controller according to a set load balancing policy after acquiring at least two flows to be detected by the detection device and at least one flow of another detection device, the first flow being transmitted from a source address to a destination address through a first switching device and a second switching device, the first switching device being coupled to the detection device and the second switching device coupled to the other detection device, and a difference between a number of flows to be detected by the detection device and a number of the flows to be detected by another detection device is less than before the deletion; and
      detect a second flow being transmitted through the first switching device and indicated by the flow identifier that is comprised in the detection instruction and no longer detect a first flow being transmitted through the first switching device, wherein the flow identifier of the first flow is not comprised in the detection instruction.

* * * * *